United States Patent [19]
Digirolamo et al.
[11] 3,708,877
[45] Jan. 9, 1973

[54] METHOD OF ANCHORING AND CONNECTING LEAD WIRES TO AN ELECTRICAL COMPONENT

[75] Inventors: Joseph Digirolamo, Elkhart; Stanley O. Bender, Berne, both of Ind.

[73] Assignee: CTS Corporation, Elkhart, Ind.

[22] Filed: Nov. 10, 1969

[21] Appl. No.: 875,278

Related U.S. Application Data

[62] Division of Ser. No. 698,824, Jan. 18, 1968, Pat. No. 3,492,536.

[52] U.S. Cl. ....................29/628
[51] Int. Cl. ....................H01r 43/00, H05k
[58] Field of Search ....................29/628, 629; 174/68.5; 317/101

[56] References Cited

UNITED STATES PATENTS

| | | | |
|---|---|---|---|
| 2,971,138 | 2/1961 | Masel et al. | 317/101 X |
| 3,012,219 | 12/1961 | Levin et al. | 29/629 UX |
| 3,029,495 | 4/1962 | Doctor | 317/101 X |
| 3,184,661 | 5/1965 | Weller et al. | 29/628 UX |
| 3,252,204 | 5/1966 | McFaddan | 29/628 X |
| 3,265,806 | 8/1966 | Burks et al. | 317/101 X |
| 3,280,378 | 10/1966 | Brady et al. | 317/101 |
| 3,337,830 | 8/1967 | Levy | 29/628 UX |
| 3,421,212 | 1/1969 | Chabot | 29/628 |
| 3,492,536 | 1/1970 | Girolamo et al. | 317/101 |
| 3,531,581 | 9/1970 | Chesemore | 29/628 X |
| 2,413,539 | 12/1946 | Ballard | 174/68.5 UX |

*Primary Examiner*—John F. Campbell
*Assistant Examiner*—Ronald J. Shore
*Attorney*—John J. Gaydos

[57] ABSTRACT

A method for anchoring a lead wire in an electrical component having a ceramic dielectric substrate is provided wherein a portion of the lead wire is placed over an opening of a notch in the substrate and forced into the notch. The notch is provided with a constricted section and an enlarged section. Application of the force deforms the lead wire and wedges a portion of the lead wire into the notch to conform at least partially to the sections of the notch.

3 Claims, 7 Drawing Figures

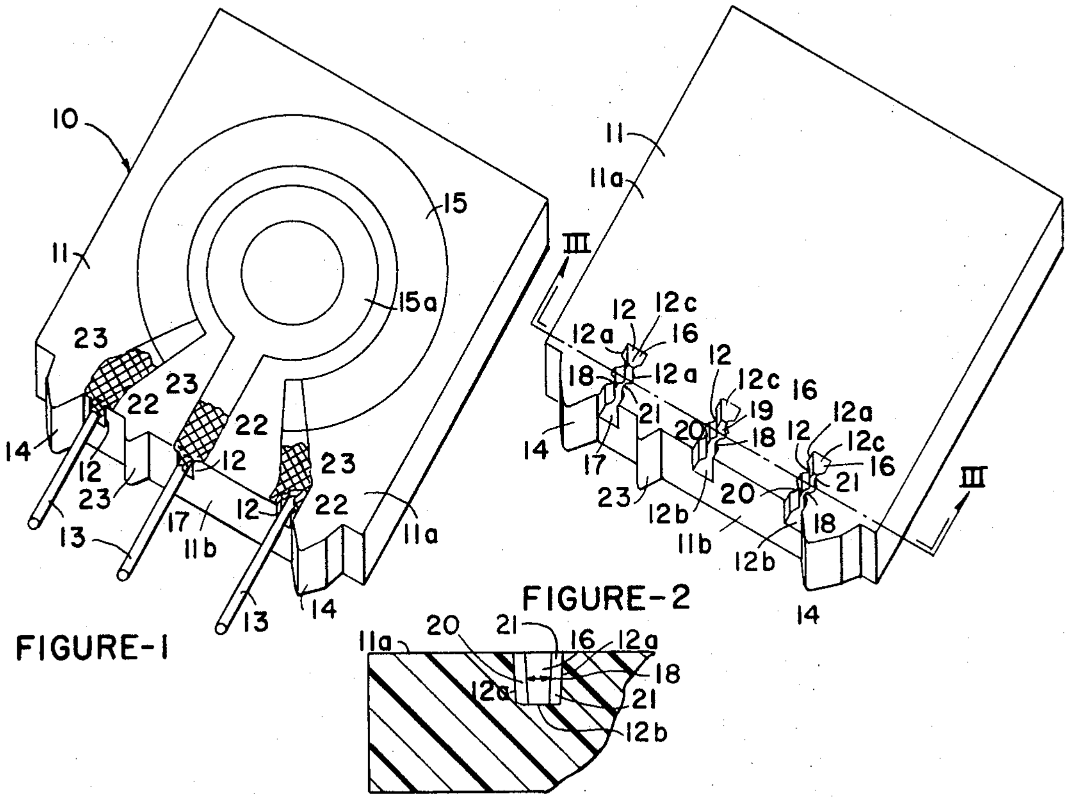
FIGURE-1, FIGURE-2
FIGURE-3
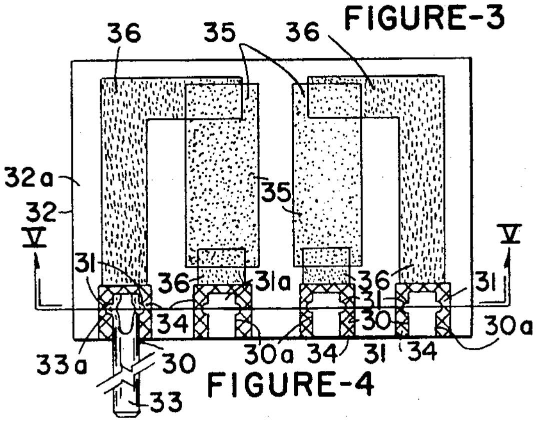
FIGURE-4
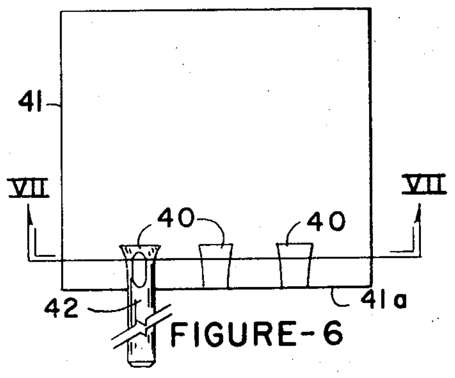
FIGURE-6
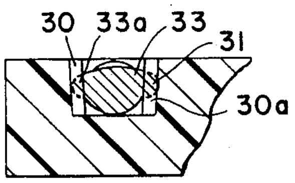
FIGURE-5
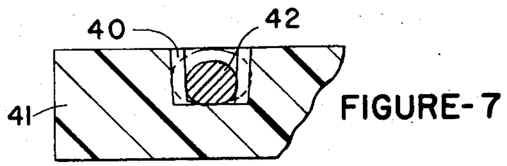
FIGURE-7
INVENTOR
JOSEPH DI GIROLAMO
STANLEY O. BENDER

METHOD OF ANCHORING AND CONNECTING LEAD WIRES TO AN ELECTRICAL COMPONENT

This is a division of application Ser. No. 698,824, filed Jan. 18, 1968, now U.S. Pat. No. 3,492,536.

The present invention relates to electrical components and, more particularly, to an improved method for anchoring and connecting lead wires to an electrical device, e.g., an active device such as a transistor or a passive device such as a resistance element or a capacitor, supported on the surface of a substrate forming part of the electrical component.

In order that the terminology used in the specification will be fully understood, certain terms will now be defined as follows:

Electrical Device—Includes both active and passive devices.

Active Device—Denotes an electrical circuit element, e.g., a diode or a transistor, capable of performing amplifying or control functions.

Passive Device—Denotes an electrical circuit element not capable of performing amplifying or control functions, e.g., a resistor or a capacitor.

For certain electronic equipment, the anchoring of lead wires to a substrate of an electrical component must be sufficiently strong to prevent the lead wires from being loosened or removed from the substrate as the electrical component is inserted into and removed from a terminal board. Brady et al. U.S. Pat. No. 3,280,378, assigned to the same assignee as the present invention, shows an electrical component having lead wires directly anchored in cavities provided in the substrate by forcing the lead wires axially into the cavities. Although the anchoring of lead wires in electrical components disclosed in the Brady et al. patent is satisfactory for certain electronic equipment, other electronic equipment requires that the axial pull-out strength of the lead wires be substantially greater than the axial pull-out strength attainable by using the Brady et al. invention. The present invention, therefore, increases the pull-out force required to remove the lead wire axially from the substrate and is an improvement in the anchoring means shown in the Brady et al. patent.

When the opening of a notch communicates only with the front surface of the substrate, it is necessary to deposit a conductive pad on the front surface around the opening and a conductive path around the edge of the substrate before the conductive pad can be connected to an electrical device deposited on the top surface of the substrate. Frequently a break or opening occurs in the conductive path at the edge of the substrate unless care is exercised in depositing the conductive material. By providing the cavities or notches with front and top openings, it is not necessary to extend the conductive path around the edge of the substrate. The top opening in the notch also facilitates insertion and deformation of the lead wire to improve the anchoring means. It would, therefore, be desirable to improve the anchoring of lead wires to a ceramic dielectric substrate and to improve the connecting means between the lead wires and the electrical device carried on a surface of the substrate.

Accordingly, it is an object of the present invention to provide a new and improved method for anchoring and connecting lead wires in a ceramic dielectric substrate. Another object of the present invention is to provide a new and improved method for anchoring and connecting lead wires in a substrate so that the lead wires have good pull-out strength both axially and normally of the lead wires. An additional object of the present invention is to provide a new and improved method for anchoring and connecting lead wires in a substrate which eliminates extending conductive pads around the edge of the substrate. A further object of the present invention is to provide a new and improved method for anchoring and connecting lead wires in a substrate by deforming the lead wires to correspond to constricted and enlarged sections in notches provided in the substrate. Further objects and advantages of the present invention will become apparent as the following description proceeds, and the features of novelty characterizing the invention will be pointed out with particularity in the claims annexed to and forming a part of this specification.

Briefly, the invention is concerned with the method of making an improved electrical component of the modular type, i.e., a circuit module, comprising a substrate of ceramic dielectric material having an electrical device supported on at least one surface thereof. The substrate is provided with a plurality of notches, each notch having a top opening communicating with the one surface, e.g., the top surface, and a front opening communicating with the front surface of the substrate. Each of the notches is provided with a constricted section and an enlarged section inwardly of the constricted portion. A portion of the lead wire is placed over one of the openings of the notch and a force is applied against the lead wire deforming the portion of the lead wire to conform at least partially to the sections of the notches, thereby increasing the pull-out strength of the lead wires both axially and normally of the lead wires. Conductive pads are then bonded to areas of the top surface of the substrate around the top openings of the notches, and metal bodies electrically connect the lead wires to the conductive pads.

FIG. 1 is an isometric view of an electrical component for a variable resistance control built in accord with the present invention;

FIG. 2 is an isometric view of a substrate employed for making the electrical component of FIG. 1;

FIG. 3 is a fragmentary sectional view taken along line III—III of FIG. 2;

FIG. 4 is a top plan view of another embodiment of the present invention;

FIG. 5 is a fragmentary sectional view taken along line V—V of FIG. 4;

FIG. 6 is a top plan view of still another embodiment of the present invention; and FIG. 7 is a fragmentary sectional view taken along line VII—VII of FIG. 6.

Referring now to FIGS. 1 and 2 of the drawings, there is illustrated an electrical component 10 comprising a substrate 11 having a plurality of notches 12 provided therein and a plurality of lead wires 13 anchored in the notches. A pair of forwardly projecting stand-offs 14 preferably integral with the front surface of the substrate 11 are useful for spacing the substrate from a not-shown mounting panel. An electrical device 15 is deposited on the top surface 11a of the substrate and electrically connected to the lead wires 13. The substrate 11 is molded of a high temperature heat-resistant material preferably a ceramic such as alumina, steatite, porcelain, barium titanate or the like and then fired. Other substrate materials such as glass can also be used so long as the firing temperature for processing the electrical device 15, e.g., a resistance element, is lower than the softening temperature of the substrate materials.

Any suitable technique and composition may be employed for depositing the electrical device 15 on the substrate. For example, the resistance composition disclosed in Faber, Sr. et al. U.S. Pat. No. 3,304,199 can be screened onto the surface 11a of the substrate and then fired to produce a resistance element. Other passive devices such as capacitors can also be deposited on the substrate. Such devices can be produced by sputtering, photoetching, screening, and other printed circuit techniques which can be employed in a conventional and well-known manner. A transistor or capacitor chip can also be deposited on the surface 11*a* of the substrate. The resistance element 15 shown in FIG. 1 of the drawings is arcuate to permit use of the component 10 as the base of a not-shown variable resistance control. A center collector 15a is deposited on the top surface 11*a* of the substrate concentric to the resistance element 15, and a not-shown rotatable contactor wipingly engaging the resistance element 15 and the center collector 15*a* is employed for altering the ohmic resistance between the center and outer terminals.

Referring now specifically to the notches 12, each notch is provided with a first or top opening 16 communicating with the top surface 11*a* of the substrate and a second or front opening 17 communicating with the front surface 11*b* of the substrate. The top surface 11*a* and the front surface are normal to each other and form an edge of the substrate. The notches can be of any desirable configuration so long as each of the notches is provided with a constricted section 18 and with an enlarged section 19, the constricted section always being closer to the front surface of the substrate than the enlarged section. Each notch is defined by a pair of side walls 12*a*, a bottom wall 12*b* and a rear wall 12*c*. The side walls 12*a* of each of the notches are provided with a pair of inwardly extending protuberances or bosses 20, 21 projecting upwardly from the bottom wall 12*b* of each of the notches. The constricted section 18 of each of the notches is defined by the distance between opposed bosses 20, 21 and the enlarged section of the notch is defined by the portion of the notch inwardly of the bosses from the front surface 11*b*. The bosses 20, 21 are tapered as best shown in FIG. 3 to increase the width of the constricted section at the top surface 11*a*. The taper extends from the bottom wall 12*b* to the top surface 11*a*. In essence the side walls 12*a* are serrated or undulated, each of the bosses 20, 21 defining the individual serrations or undulations of the side walls. Maximum pull-out strength of the lead wires 13 in the axial direction is obtained by having the major axis of each of the bosses 20, 21 vertically disposed and lying in a plane substantially parallel to the front surface 11*b*.

Before the lead wires 13 are anchored in the notches 12, conductive coatings are deposited around each of the top openings 16 of the notches 12 to form conductive pads 22. The conductive pads can also extend into the notches along the side and rear walls 12*a* and 12*c* to improve the electrical connection between the lead wires and the conductive pads. Depending upon the composition of the many types of conductive coatings readily available, the conductive pads can be air-dried or fired after being deposited on the surface of the substrate. After the conductive pads 22 are bonded to the substrate 11, the end portion of one of the lead wires 13 is positioned over one of the top openings 16 of a notch with the remainder of the lead wire extending forwardly of the front surface 11*b*, the axis of the end portion of the lead wire being parallel to the top surface 11*a* of the substrate supporting the electrical device 15. A suitable tool such as a punch then forces the end of the lead wire into the notch 12 wedging the lead wire in the substrate. Preferably the diameter of the lead wire is substantially the same as the distance between the opposed bosses 20, 21 at the constricted section and the end portion of the lead wire entering the enlarged section of the notch is deformed or flattened to increase the width of the lead wire in the enlarged section and anchor the lead wire in the notch. On the other hand, if the diameter of the lead wire is greater than the width of the constricted section, the portion of the lead wire entering the constricted section is deformed causing the diameter of the lead wire to be reduced to the width of the constricted section while the portion of the lead wire entering the enlarged section is flattened thereby increasing the width of the lead wire and anchoring the lead wire in the notch. Obviously excessive reduction or necking of the lead wires in the constricted sections unnecessarily decreases the pull-out strength of the lead wires.

After the lead wires are anchored in the notches, conductive materials such as solder bodies 23 are deposited in the notches for electrically connecting the ends of the lead wires to the conductive pads. By covering at least a portion of the side walls 12*a* of the notches 12 with the conductive coating prior to insertion of the lead wires 13, improved electrical connections are attained between the lead wires and the conductive pads since the conductive materials readily adhere to the coated side walls and to the lead wires. Preformed lead wires having a headed portion, a flattened end portion or a reduced neck portion can be employed and inserted into the notches with less force. Although such preformed lead wires will resist a substantial pull-out force in the axial direction, the pull-out strength normal to the axis of the lead wire is reduced somewhat unless sufficient anchoring of the lead wire occurs when the lead wires are connected to the conductive pads with solder. The pull-out strength normal to the axis of the lead wire can be increased by reversing the taper of the side walls 12*a* and having the bosses closer together at the top surface 11*a* instead of at the bottom wall 12*b*.

In the embodiment of FIGS. 4 and 5, lead wires 33 are inserted into notches 30 and the end portions 33*a* of the lead wires are flattened to fill the grooved or enlarged sections 31 in the side walls 30*a*. Suitable conductive pads 34 are deposited on the top surface 32*a* of the substrate 32 around each of the top openings 31*a* of the notches 30. A pair of resistance elements 35 are deposited on the substrate and conductive paths 36 also deposited on the substrate electrically connect the lead wire 33 to the resistance elements 35. Not-shown solder bodies are deposited in the notches around the end portions 33 for electrically connecting the lead wires 33 to the conductive pads. In still another embodiment shown in FIGS. 6 and 7 of the drawings, the notches 40 in the substrate 41 are of dovetail configuration and, accordingly, each of the front portions of the dovetail notches adjacent to the front surface 41a defines the constricted section of the notch while the inward or rearwardly disposed portion of the notch 40 defines the enlarged section. Lead wires 42 are anchored in the dovetail notches of the substrate in the same manner as described for the embodiments shown in FIGS. 1–5 of the drawings.

Preferably the side walls are tapered slightly toward the bottom wall for all of the notches shown in FIGS. 1–7 of the drawings to facilitate molding of the substrates, the tapers can be reversed. Although all of the notches shown in the drawings are symmetrical, i.e., one side wall of a notch is symmetrical to the other side wall, a notch can have nonsymmetrical walls, e.g., the boss or groove need only be a part of one of the side walls and the other side wall can be substantially planar.

From the above description, it will be apparent that a very simple and improved means for securing the lead wires to a substrate has been provided. In view of the above discussion, the steps involved in making the notches in the substrates and securing the lead wires in the notches of the substrate will be clearly understood and no further discussion is included herewith.

While there has been illustrated and described what is present considered to be a preferred embodiment of the present invention, and two modifications thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A method of connecting a lead wire to an electrical device supported on a surface of a substrate having a plurality of notches, each of said notches having a top opening communicating with the top surface of the substrate and a front opening communicating with the front surface of the substrate, each of said notches having walls forming a constricted section and an enlarged section, said constricted section being disposed between one of said surfaces and said enlarged section, the method comprising: depositing a conductive coating around a portion of the edge of one of said openings of one of said notches to form a conductive pad, electrically connecting said electrical device to said pad, covering at least a portion of the walls of said one of said notches with a conductive coating, placing an end portion of a lead wire over said one of said openings, applying a force against the lead wire and simultaneously forcing the lead wire into said one of said notches and deforming said portion of the lead wire and altering the cross section of the lead wire to conform at least partially to the enlarged and constricted sections of said one of said notches and thereby securing said wire against both axial and normal forces, and depositing conductive material in said one of said notches for electrically connecting the end portion of the lead wire to said conductive pad.

2. A method of connecting a lead wire to an electrical device supported on a surface of a ceramic dielectric substrate having a plurality of notches, each of the notches having a top opening communicating with a top surface of the substrate and a front opening communicating with a front surface of the substrate, each of said notches having a constricted section and an enlarged section, said constricted section being disposed between one of said surfaces and said enlarged section, the method comprising: depositing a conductive coating around a portion of the edge of one of said openings of one of said notches to form a conductive pad, electrically connecting said electrical device to said pad, placing an end portion of the lead wire into said one of said notches by applying a force normal to the axis of the lead wire and against the end portion thereof and simultaneously deforming the end portion of the lead wire and altering the cross section of the lead wire to conform at least partially to the enlarged and constricted sections of said one of said notches, and depositing conductive material in said one of said notches for electrically connecting the end of the lead wire to said conductive pad.

3. A method of connecting a lead wire to an electrical device supported on a surface of a ceramic dielectric substrate having a plurality of notches, each of said notches having a top opening communicating with a top surface of the substrate and a front opening communicating with a front surface of the substrate, each of said notches having a constricted section and an enlarged section, said constricted section being disposed between one of said surfaces and said enlarged section, the method comprising: depositing a conductive coating around a portion of the edge of one of said openings of one of said notches to form a conductive pad, electrically connecting said electrical device to said pad, preforming a portion of the lead wire, placing a portion of the preformed lead wire over one of the openings of one of said notches, and applying a force against the lead wire and simultaneously forcing the lead wire into said one of said notches and deforming said portion of the lead wire and altering the cross section of the lead wire to conform at least partially to the enlarged and constricted sections of said one of said notches, electrically connecting the end of the lead wire to said conductive pad.

* * * * *